(12) United States Patent
Blanco et al.

(10) Patent No.: US 9,709,807 B2
(45) Date of Patent: Jul. 18, 2017

(54) OUT OF FOCUS NOTIFICATIONS

(71) Applicant: MOTOROLA SOLUTIONS, INC., Schaumburg, IL (US)

(72) Inventors: Alejandro G. Blanco, Fort Lauderdale, FL (US); Bert Van Der Zaag, Golden, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 83 days.

(21) Appl. No.: 14/931,700

(22) Filed: Nov. 3, 2015

(65) Prior Publication Data
US 2017/0123210 A1 May 4, 2017

(51) Int. Cl.
G02B 27/01 (2006.01)
G06F 3/01 (2006.01)
G06F 3/0481 (2013.01)

(52) U.S. Cl.
CPC ......... *G02B 27/0172* (2013.01); *G06F 3/013* (2013.01); *G06F 3/04817* (2013.01); *G02B 2027/014* (2013.01); *G02B 2027/0123* (2013.01); *G02B 2027/0127* (2013.01); *G02B 2027/0141* (2013.01); *G02B 2027/0178* (2013.01)

(58) Field of Classification Search
CPC .. G02B 27/0172; G06F 3/013; G06F 3/04817
USPC ........................................ 345/156
See application file for complete search history.

(56) References Cited

U.S. PATENT DOCUMENTS

| 5,196,877 | A | * | 3/1993 | Mukai | G02B 7/102 396/281 |
|---|---|---|---|---|---|
| 6,329,963 | B1 | * | 12/2001 | Chiabrera | G06T 15/10 345/589 |
| 8,928,558 | B2 | | 1/2015 | Lewis et al. | |
| 8,950,867 | B2 | | 2/2015 | Macnamara | |
| 2002/0191100 | A1 | * | 12/2002 | Matsunaga | H04N 5/23212 348/345 |

(Continued)

OTHER PUBLICATIONS

Vidal et al., "Looking at or Through? Using Eye Tracking to Infer Attention Location for Wearable Transparent Displays," article (2014) 4 pages, Seattle.

*Primary Examiner* — Fred Tzeng
(74) *Attorney, Agent, or Firm* — Michael Best & Friedrich LLP

(57) ABSTRACT

A head-mounted display for displaying out of focus notification. The head-mounted display includes a display projector, a lens system, and an eye tracking assembly capable of tracking a direction of an eye. The head-mounted display further includes an electronic processor that controls the display projector based on received data from the eye tracking assembly. The electronic processor determines, based on received data from the eye tracking assembly, at least one of a first focal distance, a second focal distance, and a third focal distance. The electronic processor controls the display projector to display an icon associated with a notification at the second focal distance. The second focal distance is out of focus with respect to the first focal distance. The electronic processor further controls the display projector to display information associated with the notification in response to changes in focal distance determined by the electronic processor.

20 Claims, 12 Drawing Sheets

(56) References Cited

U.S. PATENT DOCUMENTS

| | | | |
|---|---|---|---|
| 2008/0309835 A1* | 12/2008 | Kuba | G02F 1/133526 |
| | | | 349/1 |
| 2012/0113092 A1 | 5/2012 | Bar-Zeev et al. | |
| 2012/0127062 A1 | 5/2012 | Bar-Zeev et al. | |
| 2012/0154277 A1* | 6/2012 | Bar-Zeev | G02B 27/017 |
| | | | 345/158 |
| 2013/0241805 A1 | 9/2013 | Gomez | |
| 2013/0278631 A1 | 10/2013 | Border et al. | |
| 2014/0347623 A1 | 11/2014 | Inoue et al. | |
| 2016/0025983 A1* | 1/2016 | Ikeda | G02B 27/0172 |
| | | | 345/173 |

* cited by examiner

OUT OF FOCUS NOTIFICATIONS

BACKGROUND OF THE INVENTION

Head-mounted displays exist that allow a user to see the surrounding environment as well as content rendered by the head-mounted display. Some head-mounted displays are capable of rendering content at varying focal distances. With existing eye-tracking technology, it is possible to determine the direction in which a user is looking and the focal distance between the user's eyes and the point in space on which the user's gaze is focused. There are numerous instances in which it is desirable to provide a visual, informational notification to a user via a head-mounted display without obscuring the user's view of the surrounding environment. The typical approach is to display informational notifications at the edges of the user's field of vision. However, displaying informational notifications at the edges of the user's field of vision may block the user's peripheral vision or may distract the user.

Accordingly, there is a need for displaying out of focus notifications on a head-mounted display.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
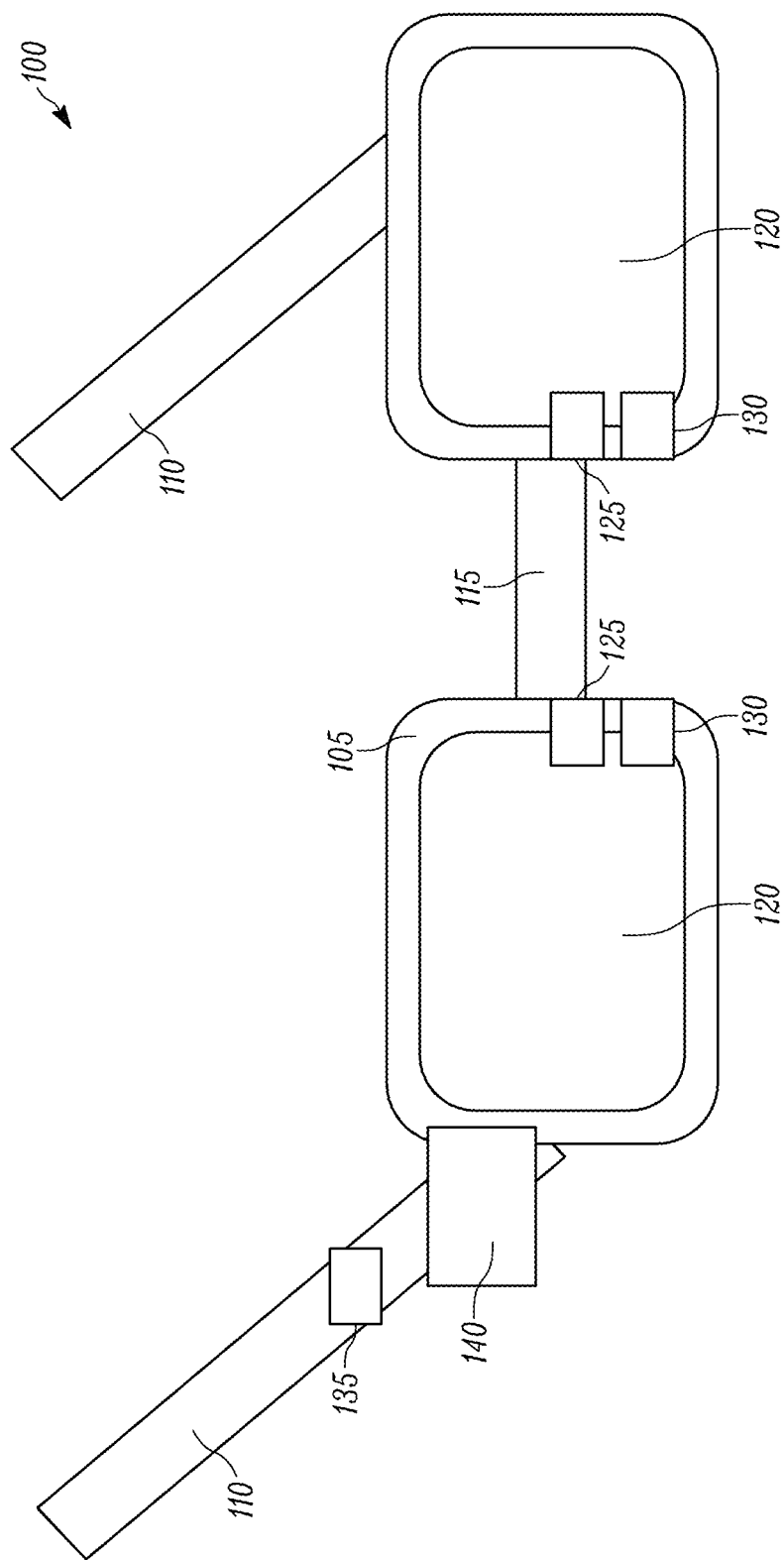
FIG. 1 illustrates a head-mounted display in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Embodiments of the invention include a head-mounted display including a display projector, a lens system, and an eye tracking assembly capable of tracking a direction of an eye. The head-mounted display further includes an electronic processor that controls the display projector based on received data from the eye tracking assembly. The electronic processor determines, based on received data from the eye tracking assembly, at least one focal distance selected from the group consisting of a first focal distance, a second focal distance, and a third focal distance. The electronic processor controls the display projector to display, on the lens system, an icon associated with a notification at the second focal distance. The second focal distance is out of focus with respect to the first focal distance. The electronic processor further controls the display projector to display, on the lens system, information associated with the notification in response to changes in focal distance determined by the electronic processor based on received data from the eye tracking assembly.

Some embodiments include a method of displaying information on a head-mounted display. In one exemplary embodiment, the method includes determining, with an eye tracking assembly and an electronic processor of the head-mounted display, a first focal distance based on a first distance at which eyes are focused. The method further includes determining, with the eye tracking assembly and the electronic processor of the head-mounted display, a first location in a field of vision where the eyes are looking. The method further includes displaying, with a display projector and a lens system of the head-mounted display, an icon at a second location in the field of vision at a second focal distance. The second focal distance is out of focus with respect to the first focal distance. The method further includes determining, with the eye tracking assembly and the electronic processor of the head-mounted display, whether the eyes are looking at the second location in the field of vision and whether the eyes are focused at a second distance that is substantially the same as the second focal distance. The method further includes displaying, with the display projector and the lens system of the head-mounted display, information associated with the icon in the field of vision at at least one focal distance selected from the group consisting of the second focal distance and a third focal distance. The third focal distance is determined based on a third distance at which the eyes are focused after the eyes have viewed the second location in the field of vision.

Some embodiments include a head-mounted display controlled at least in part by tracked eye movements of eyes of a user within a field of vision. The head-mounted display includes at least one display projector, a lens system, and an eye tracking assembly capable of tracking a direction of an eye. The head-mounted display further includes an electronic processor configured to obtain data from the eye tracking assembly and determine a first focal distance based on a first distance at which the eyes are focused. The electronic processor is further configured to determine a first location in the field of vision where the eyes are looking. The electronic processor is further configured to control the at least one display projector to display, on the lens system, an icon at a second location in the field of vision at a second focal distance. The second focal distance is out of focus with respect to the first focal distance. The electronic processor is further configured to determine whether the eyes are looking at the second location in the field of vision and whether the eyes are focused at a second distance that is substantially the same as the second focal distance. The electronic processor is further configured to control the at least one display projector to display, on the lens system, at at least one focal distance selected from the group consisting of the second focal distance and a third focal distance, information associated with the icon in the field of vision. The third focal distance is determined based on a third distance at which the eyes are focused after the eyes have moved from the second location in the field of vision.

FIG. 1 illustrates a head-mounted display 100 in accordance with some embodiments. In the example illustrated, the head-mounted display 100 includes a frame 105 that includes earpieces 110 and a nosepiece 115. A lens system 120 is secured within the frame 105. The construction of the head-mounted display 100 shown in FIG. 1 is merely exemplary. For example, although FIG. 1 illustrates two lenses, in some embodiments, the lens system 120 includes more or less lenses. Furthermore, the lens system 120 may be any other existing lens system or later-known lens system. For example, the frame 105 may not have the nosepiece 115 in some embodiments. Further, in some embodiments, the frame 105 may not be present at all. The head-mounted display 100 may be worn by a user such that the eyes of the user are able to look through the lens system 120.

The head-mounted display 100 further includes an infrared projector 125, an eye tracking assembly 130, and an electronic processor 135. In some embodiments, the eye tracking assembly 130 is an eye tracking camera. The infrared projector 125 projects infrared light at the eyes of a user which allows the eye tracking assembly 130 to track a direction of the user's eyes (that is, tracking where the user is directing his or her gaze). In some embodiments, for example, the infrared projector 125 is coaxial with an optical path of the eyes (e.g., bright pupil eye tracking). In other embodiments, the infrared projector 125 is offset with the optical path of the eyes (e.g., dark pupil eye tracking). In some embodiments, as shown in the exemplary embodiment of FIG. 1, the head-mounted display 100 includes more than one infrared projector 125 and eye tracking assembly 130.

In alternative embodiments, the infrared projector 125 may not be present and the eye tracking assembly 130 may track the direction of the eyes using, for example, corneal reflections of visible light. Accordingly, the eye tracking assembly 130 may use one of many eye tracking methods known to those skilled in the art as well as later-known eye tracking methods.

The eye tracking assembly 130 can communicate, to the electronic processor 135, data relating to the direction of the user's eyes. The electronic processor 135 uses that data to determine the location in a field of vision where the eyes are looking and a distance at which the eyes of the user are focused (that is, focal distance).

The head-mounted display 100 further includes a display projector 140. The electronic processor 135 controls the display projector 140 to display images on the lens system 120. This description of the display projector 140 and the lens system 120 is exemplary and should not be considered as restricting. For example, in alternative embodiments, the lens system 120 itself may be capable of displaying images. In some embodiments, a flexible organic light-emitting diode (OLED) display may be used to display images. Images displayed with the display projector 140 and the lens system 120 may be displayed at a predetermined location within a field of vision of the user. Additionally, the electronic processor 135 controls the display projector 140 to display an image on the lens system 120 such that the image appears to be at a predetermined focal distance from the user.

For example, an image may be displayed such that it would appear to be in focus to a user focusing his or her vision at a distance of one (1) meter. However, that same image would appear to be out of focus to a user who was focusing his or her vision at another focal distance (for example, three (3) meters). In some embodiments, the head-mounted display 100 includes more than one display projector 140 (that is, each lens of the lens system 120 may have a separate display projector 140). The display projector 140 may display images in various ways that are perceivable to the eyes of the user (that is, text, icons, photos, etc.).

Figure 2:
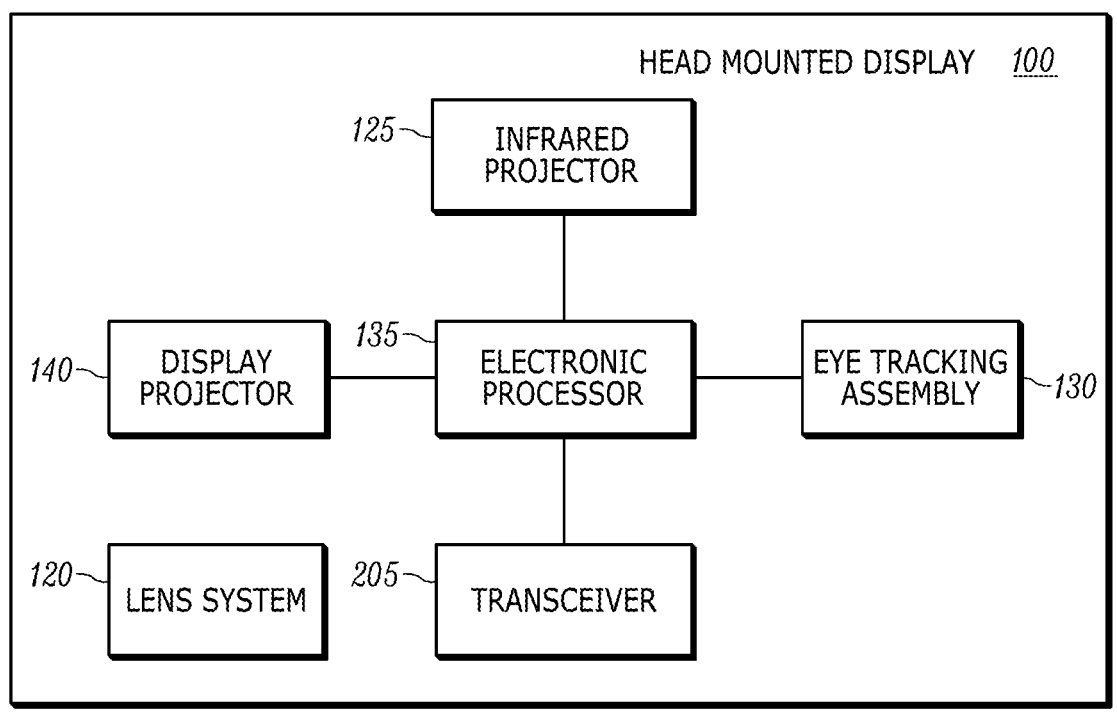
FIG. 2 illustrates a block diagram of the head-mounted display in accordance with some embodiments.

FIG. 2 illustrates a block diagram of the exemplary head-mounted display 100. In addition to the components shown in FIG. 1, FIG. 2 illustrates a transceiver 205 of the head-mounted display 100. The transceiver 205 may send data from the head-mounted display 100 to another device. The transceiver 205 may also receive data from another device. The electronic processor 135 may receive data from the transceiver 205 and control the display projector 140 based on the received data.

For example, the transceiver 205 may receive, from a mobile communication device, a notification that is to be displayed to the user. The notification may be received by the transceiver 205 as a result of the mobile communication device receiving information such as an incoming telephone call or text message. The electronic processor 135 may control the display projector 140 to display the notification received by the transceiver 205 to the user, as will be described in more detail below. The transceiver 205 is exemplary. Other embodiments include other types of transceivers including, but not limited to, radio frequency modems, frequency modulation two-way radios, long-term evolution (LTE) transceivers, code division multiple access (CDMA) transceivers, Wi-Fi (that is, IEEE 802.11x) modules, etc.

Human eyes are able to adjust focus such that some objects being viewed are in focus while other objects being viewed are out of focus. Human eyes are able to adjust focus more effectively when objects being viewed are at a close distance to the eyes (that is, short focal distance) than when objects being viewed are at a far distance from the eyes (that is, long focal distance). For example, the eyes of one exemplary person may be able to perceive different focal distances of objects within approximately three meters of the eyes. When an object is beyond approximately three meters from the eyes of the exemplary person, the eyes perceive a focal distance of infinity. Accordingly, the eyes of the exemplary person may perceive a focal distance of infinity for an object that is located five meters away and for an object that is located twenty meters away. The above distance of three (3) meters is merely exemplary and varies depending on the capability of the eyes of each user.

Figure 3A:
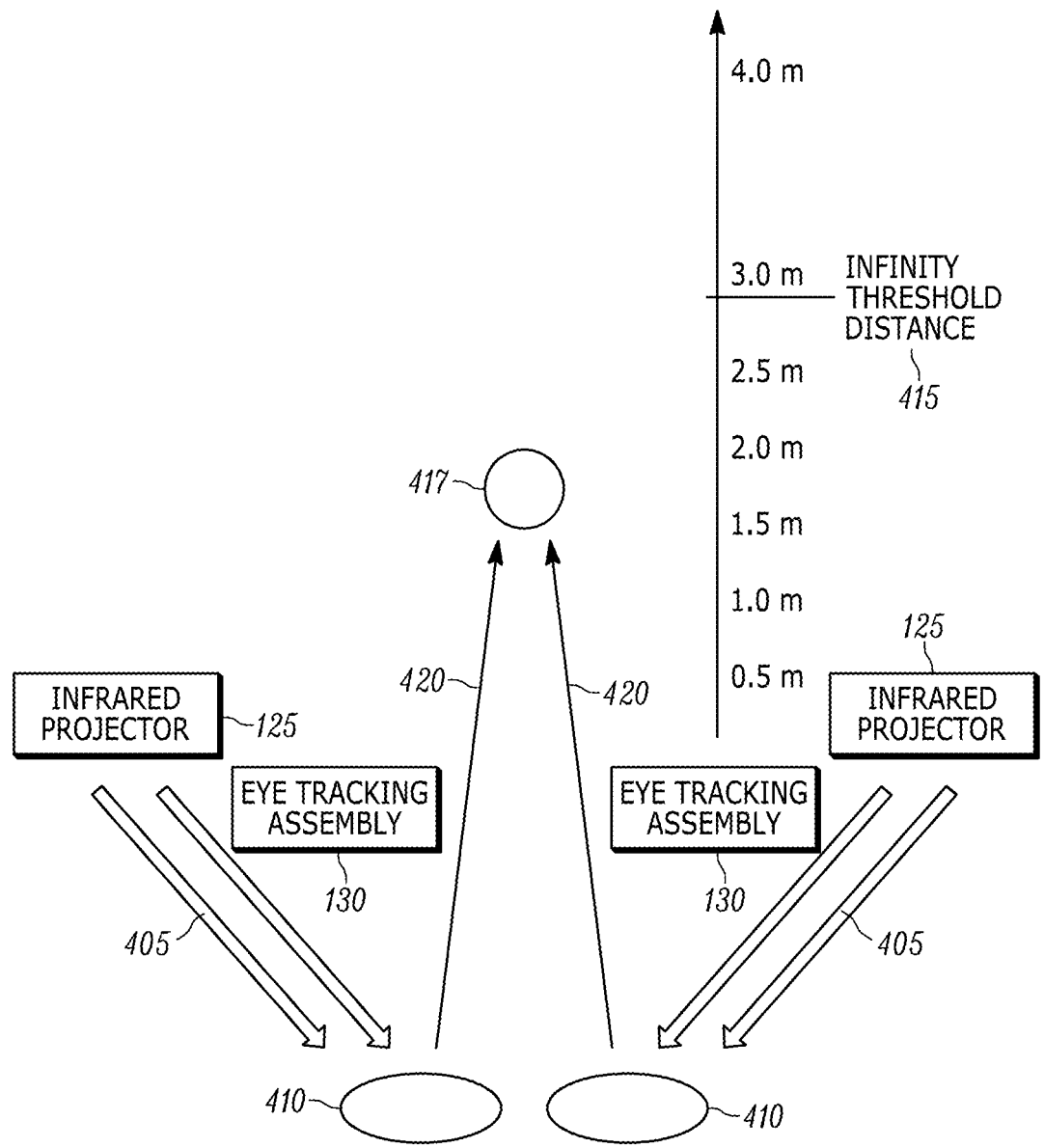
FIGS. 3A and 3B illustrate the operation of the head-mounted display in two exemplary scenarios.
Figure 3B:
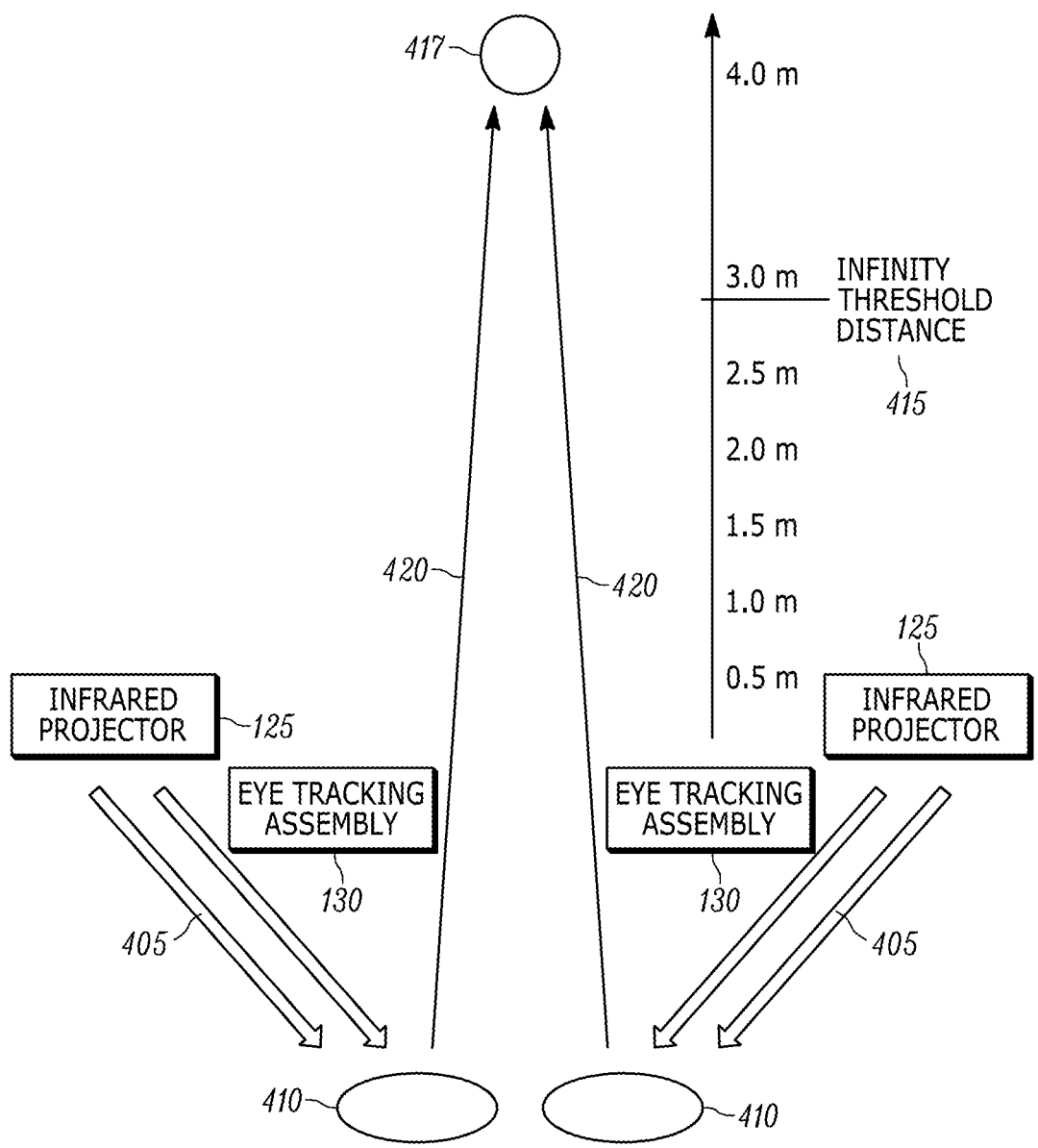

FIGS. 3A and 3B illustrate the operation of the head-mounted display 100 in two exemplary scenarios. Although FIGS. 3A and 3B do not show all the components of the head-mounted display 100, the components of the head-mounted display 100 described in previous paragraphs may also be present. Furthermore, FIGS. 3A and 3B are exemplary and should not be considered as restricting the placement of the components on the head-mounted display 100. In FIGS. 3A and 3B, infrared projectors 125 project infrared light 405 toward the eyes 410 of the user. The eye tracking assemblies 130 track the direction of the eyes 410, as explained in previous paragraphs. FIGS. 3A and 3B also illustrate an infinity threshold distance 415 that corresponds to the distance beyond which the eyes of the user perceive all objects as being at a focal distance of infinity.

As illustrated in FIG. 3A, when the eyes 410 of the user are looking at an object 417 that is approximately 1.5 meters away from the user (as indicated by viewing paths 420), the eyes of the user are focused at a focal distance of 1.5 meters. As illustrated in FIG. 3B, when the object 417 is farther away from the user than the infinity threshold distance 415 (as indicated by viewing paths 420), the eyes 410 of the user are focused at a focal distance of infinity.

The electronic processor 135 receives data from the eye tracking assemblies 130 relating to the direction of the user's eyes. Using this data, the electronic processor 135 determines the distance at which the eyes of the user are focused (that is, the focal distance). Using this data, the electronic processor 135 also determines the location, in the field of vision, where the eyes of the user are looking. As described in detail below, the electronic processor 135 uses the determined focal distance and location to control the display projector 140 to display images on the lens system 120 at predetermined focal distances and at predetermined locations within the field of vision of the user.

Figure 4A:
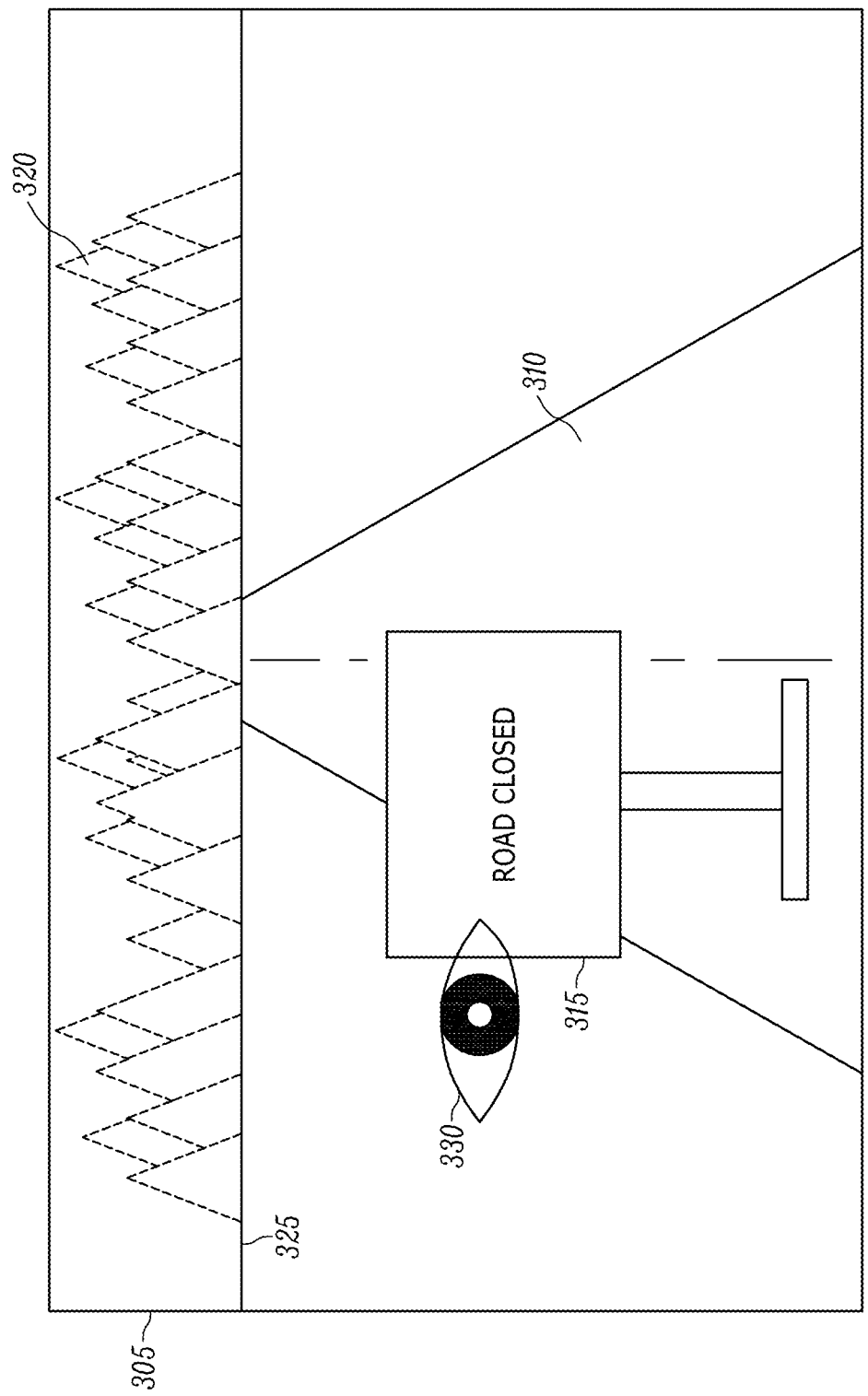
FIGS. 4A and 4B illustrate a field of vision of a user of the head-mounted display in scenarios that correspond to those of FIGS. 3A and 3B, respectively.
Figure 4B:
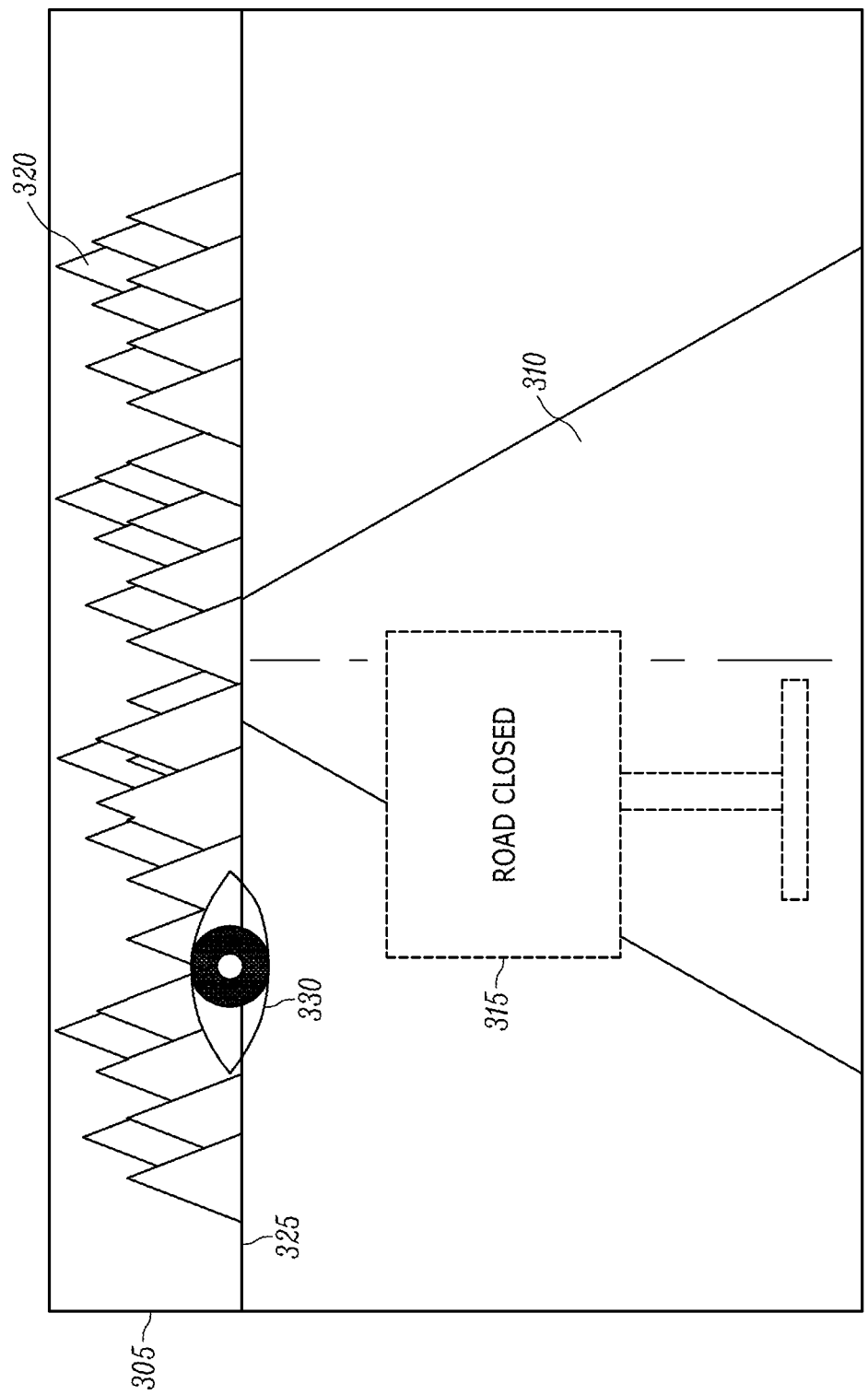

FIGS. 4A and 4B illustrate a field of vision 305 of the user of the head-mounted display 100 in scenarios that correspond to those of FIGS. 3A and 3B, respectively. Within the field of vision 305 of the eyes of the user, FIGS. 4A and 4B illustrate a road 310, a sign 315, and a mountain range 320 at a horizon line 325. FIGS. 4A and 4B also include an eye symbol 330 that indicates where the eyes of the user are looking in the field of vision 305. For example, in FIG. 4A, the eye symbol 330 is near the sign 315, which indicates that the eyes of the user are looking at the sign 315 and that the sign 315 is in focus with respect to the eyes of the user. In FIG. 4A dashed and solid lines are used to represent whether objects are in focus or out of focus. The sign 315 is shown in solid lines in FIG. 4A to represent that the eyes of the user are looking at a location that approximately corresponds to the location of the sign 315 and are focused at a distance that approximately corresponds to the distance of the sign 315. Accordingly, in FIG. 4A, the mountain range 320 is shown in dashed lines to indicate that the mountain range 320 is out of focus with respect to the eyes of the user (that is, the eyes of the user are focused at a distance that is different than the focal distance of the mountain range 320).

In FIG. 4B, the eye symbol 330 is positioned near the mountain range 320 to represent that the eyes of the user are looking at the mountain range 320 and that the mountain range 320 is in focus with respect to the eyes of the user. The mountain range 320 is shown in solid lines in FIG. 4B to indicate that the eyes of the user are looking at a location that approximately corresponds to the location of the mountain range 320 and are focused at a distance that approximately corresponds to the distance of the mountain range 320. In FIG. 4B, the sign 315 is shown in dashed lines to indicate that the sign 315 is out of focus with respect to the eyes of the user (that is, the eyes of the user are focused at a distance that is different than the focal distance of the sign 315).

Figure 5A:
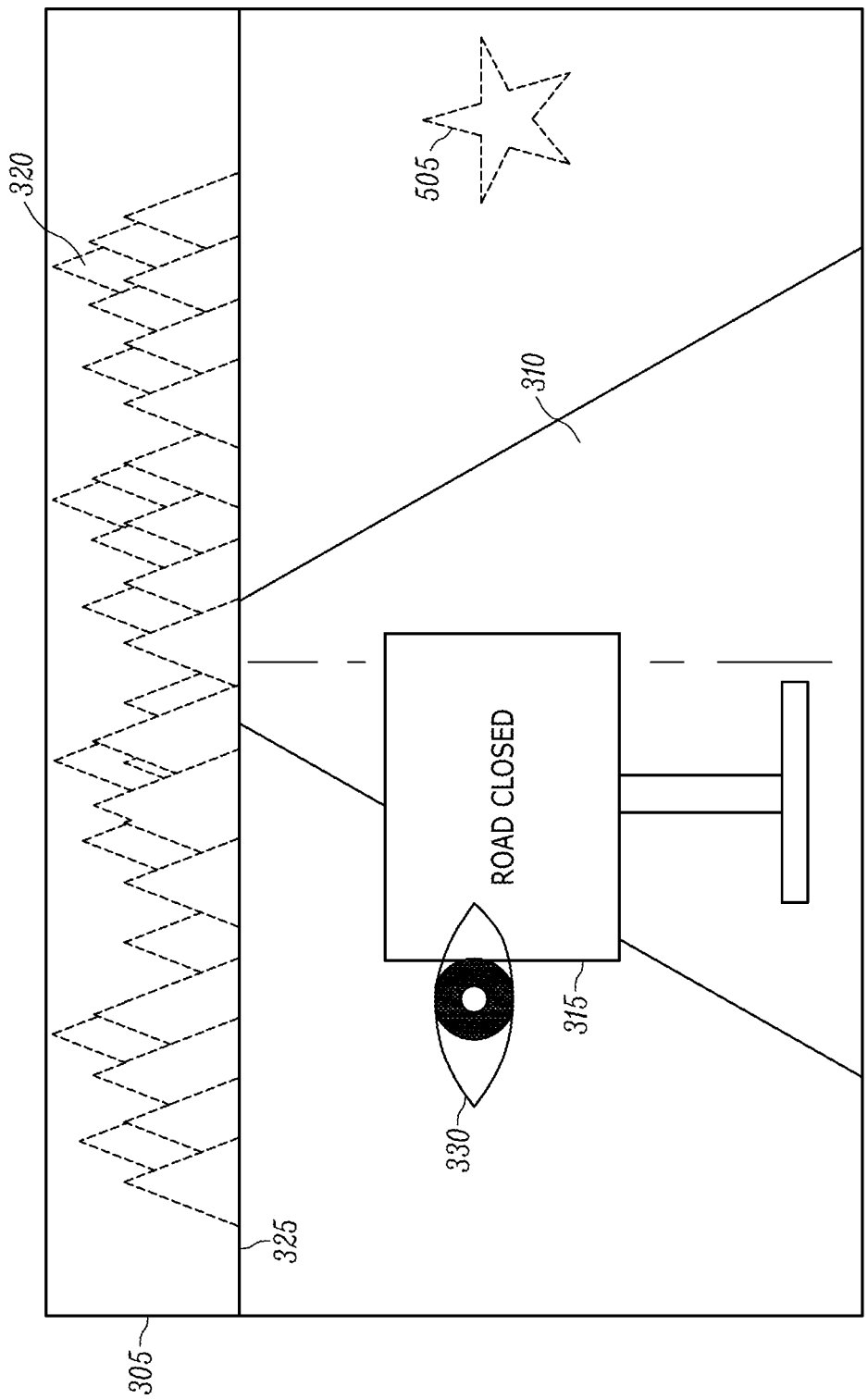
FIGS. 5A through 5D illustrate how icons and information may be displayed on the head-mounted display in some exemplary embodiments.

FIGS. 5A through 5D illustrate how notifications and information may be displayed with the display projector 140 and lens system 120 in some exemplary embodiments. FIG. 5A is similar to FIG. 4A as indicated by the location of the eye symbol 330 in the drawing—near the sign 315. To represent that the eyes of the user are looking at a location that approximately corresponds to the location of the sign 315 and are focused at a distance that approximately corresponds to the distance of the sign 315, the sign 315 is shown in solid lines in FIG. 5A. Accordingly, in FIG. 5A, the mountain range 320 is shown in dashed lines to indicate that the mountain range 320 is out of focus with respect to the eyes of the user.

The electronic processor 135 receives data from the eye tracking assemblies 130 that indicates that the eyes of the user are looking at the sign 315. The electronic processor 135 may use this data to control the display projector 140 to display an icon 505 on the lens system 120. The icon 505 may be a notification to the user that information is available (that is, an alert relating to an emergency, a notification that a message was received, a reminder to perform a task, etc.). The electronic processor 135 may associate a notification received by the transceiver 205 from another device (that is, a notification from the mobile communication device as described in previous paragraphs) with the icon 505. In FIG. 5A, the icon 505 is in the shape of a star. In some embodiments, the icon 505 is a circle, square, or any other shape.

The location of the icon 505 within the field of vision 305 where the display projector 140 displays the icon 505 may be based on the data received by the electronic processor 135 from the eye tracking assemblies 130 (that is, the icon 505 may be displayed where the eyes of the user are determined not to be looking). For example, the icon 505 in FIG. 5A is displayed on the right edge of the field of vision when the eyes of the user are looking at the sign 315, which is located to the left of the center of the field of vision 305.

Additionally, the focal distance at which the display projector 140 displays the icon 505 on the lens system 120 may also be based on the data received by the electronic processor 135 from the eye tracking assemblies 130. For example, the icon 505 in FIG. 5A is displayed at a focal distance that is out of focus with respect to the eyes of the user, as indicated by the icon 505 being shown in dashed lines. The icon 505 may be displayed at a focal distance that is less than the distance at which the eyes of the user are focused or at a focal distance that is greater than the distance at which the eyes of the user are focused. Assuming that the sign 315 is at a distance of approximately 1.5 meters from the eyes of the user, corresponding to the example of FIG. 3A, the icon 505 may be displayed at a focal distance of 0.5 meters, at a focal distance of infinity, or at another focal distance that is out of focus with respect to the eyes of the user.

Figure 5B:
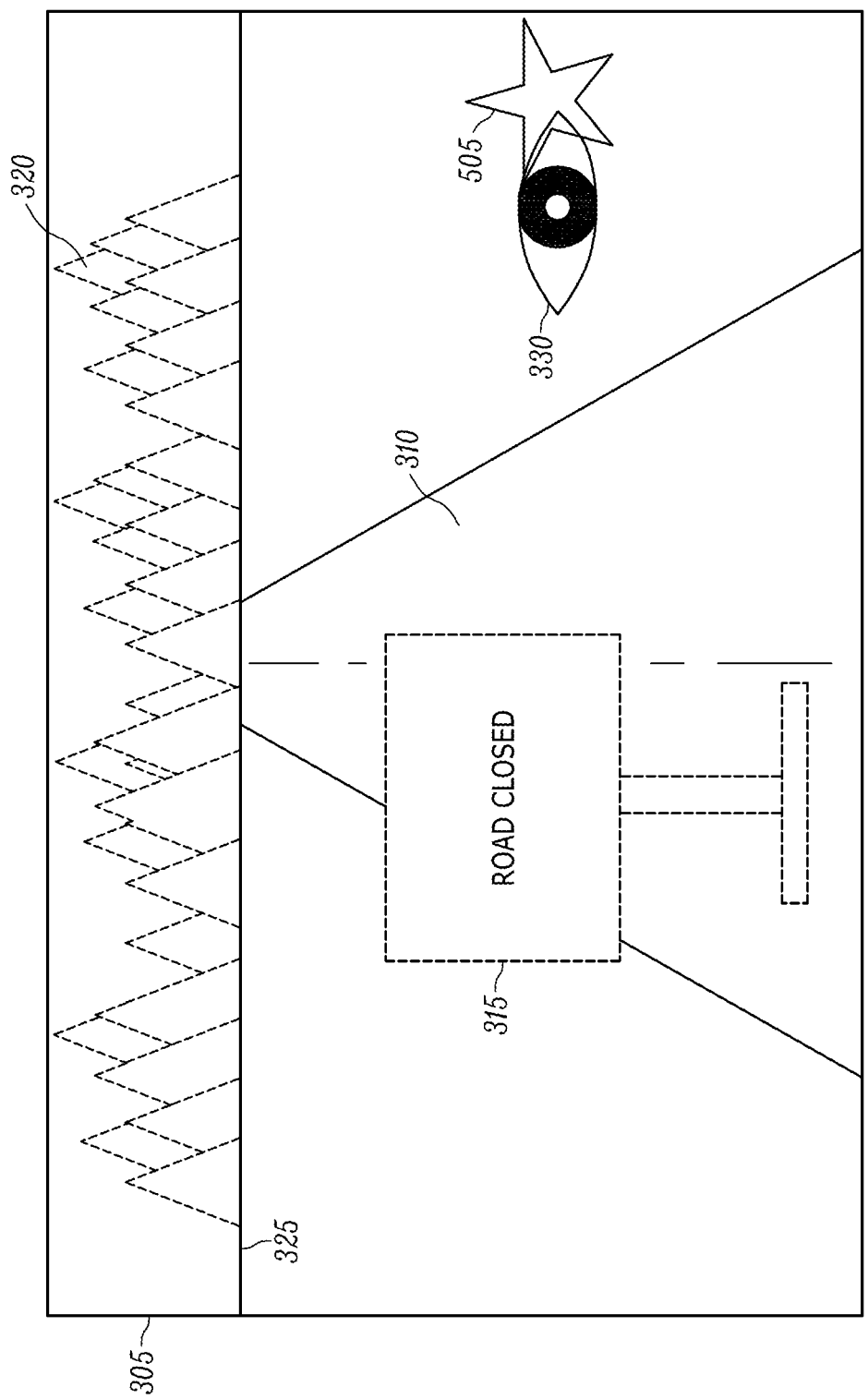

The icon 505 remains at the location where it was displayed by the display projector 140 until the eyes of the user look at the icon 505 (that is, the eyes look at the location in the field of vision 305 where the icon 505 was displayed and are focused at a distance that is substantially the same as the focal distance at which the icon 505 was displayed). This situation is illustrated in FIG. 5B. In FIG. 5B, the eye symbol 330 is near the icon 505, which indicates that the eyes of the user are looking at the icon 505 and that the icon 505 is in focus with respect to the eyes of the user. To represent that the eyes of the user are looking at the icon 505, the icon 505 is shown in solid lines in FIG. 5B. Accordingly, in FIG. 5B, the sign 315 and the mountain range 320 are shown in dashed lines to indicate that the sign 315 and the mountain range 320 are out of focus with respect to the eyes of the user.

Figure 5C:
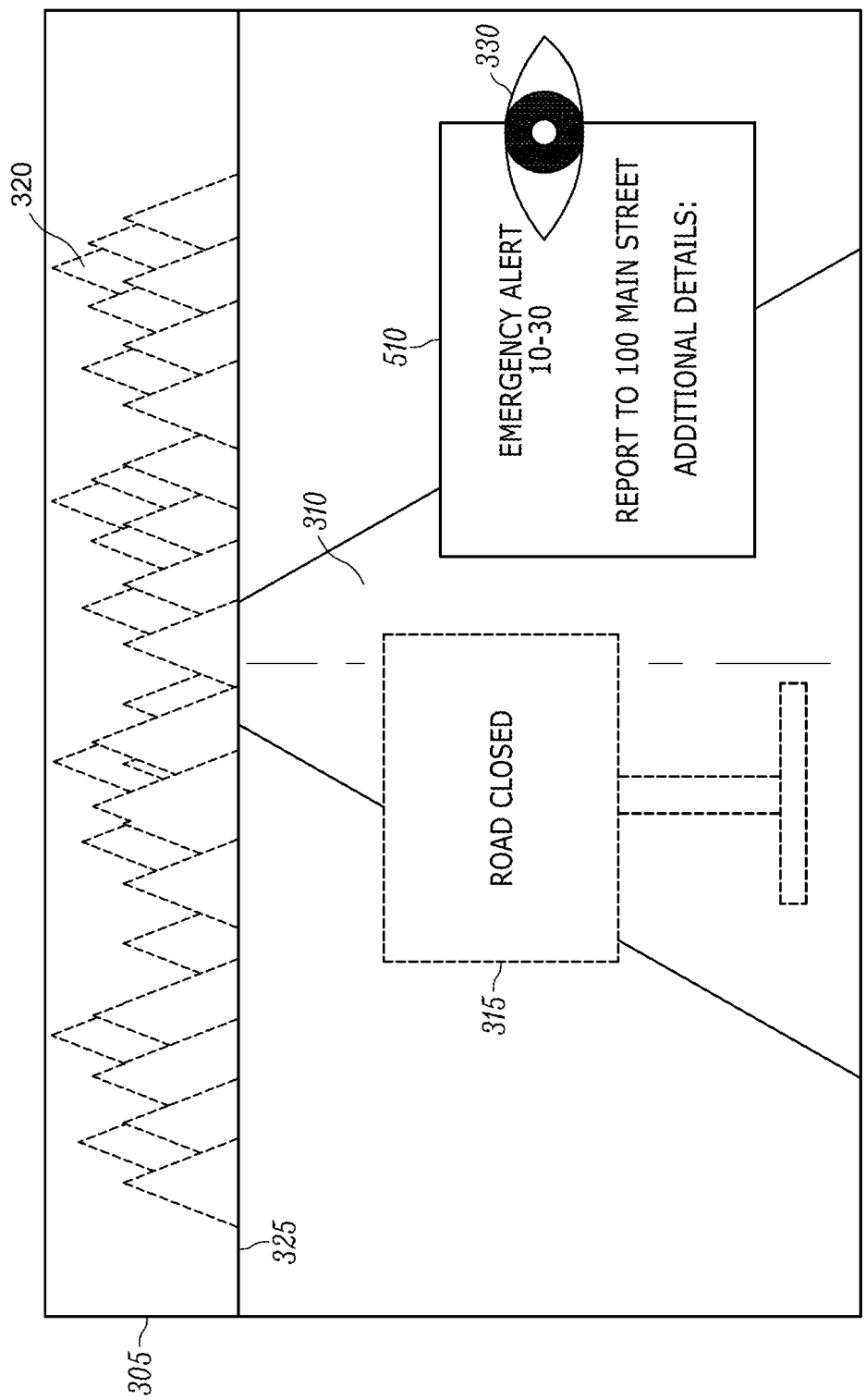

As shown in FIG. 5C, when the eyes of the user look at the icon 505, information associated with the icon 505 is displayed in the field of vision 305. The information associated with the icon 505 may be displayed in an information window 510. The information shown in FIG. 5C is exemplary. The information displayed may include a description of a situation, a code corresponding to a predetermined situation, directions to a location, an amount of time until backup arrives, an emergency condition of an individual (that is, a work partner), or other additional details. The information can be displayed in a number of ways depending on predetermined settings of the head-mounted display 100. For example, in FIG. 5C, the information window 510 is displayed at approximately the same location as the icon 505 and at substantially the same focal distance at which the icon 505 was displayed.

In some embodiments, the information window 510 may include information received by the transceiver 205 from a mobile communication device, as described in previous paragraphs. For example, the information window 510 may include information about an incoming telephone call received by the mobile communication device (that is, a caller identification, a telephone number, etc.). The information window 510 may also include a text message received by the mobile communication device.

Figure 5D:
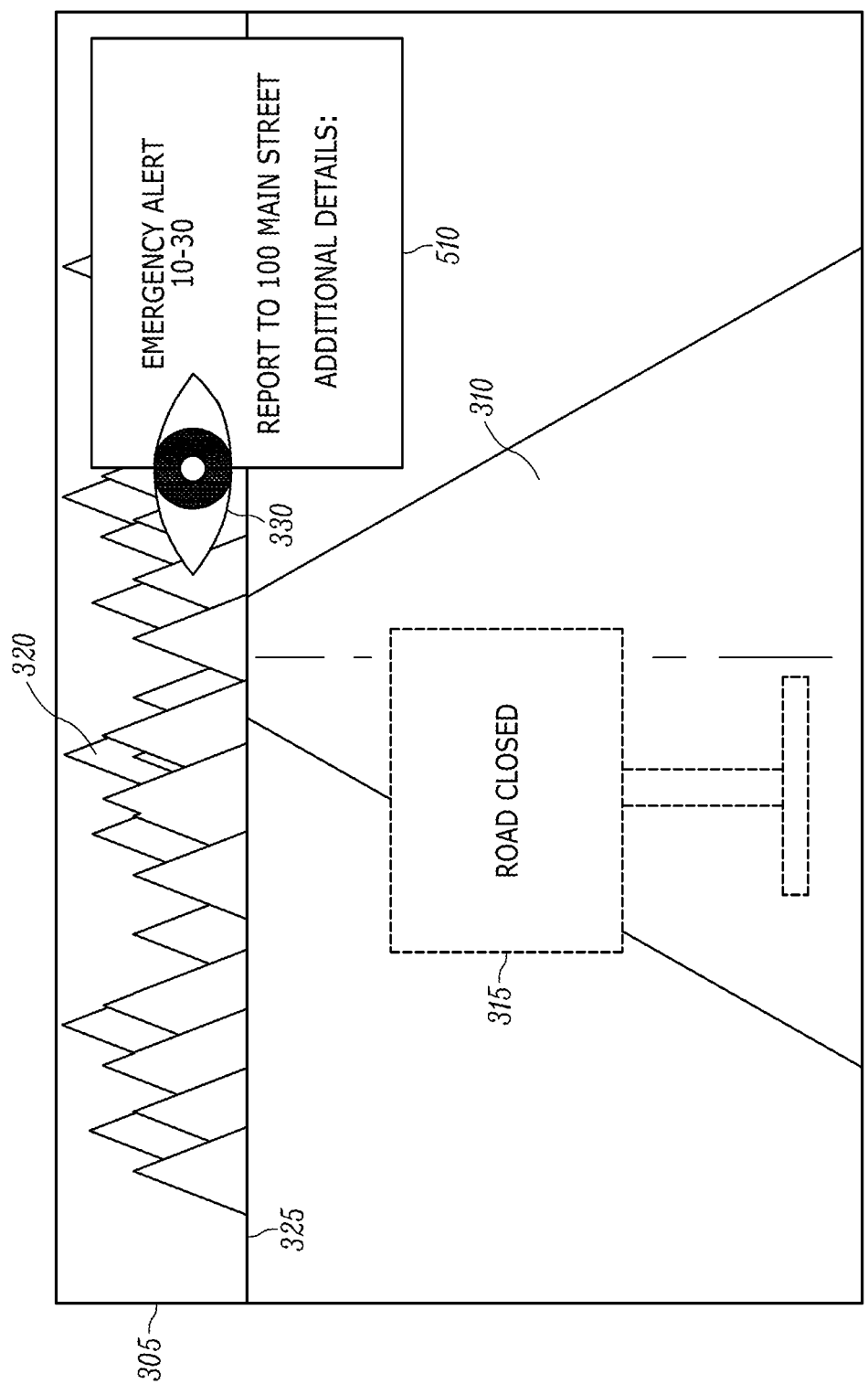

In some embodiments, as shown in FIG. 5D, the information window 510 is displayed at a location and at a focal distance that correspond to the location and focal distance where the eyes of the user are looking in the field of vision 305 after the eyes of the user have viewed the icon 505. Specifically, using data from the eye tracking assemblies 130, the electronic processor 135 may detect when the eyes of the user look at the icon 505, as shown in FIG. 5B. The electronic processor 135 may also detect movement of the eyes to a new resting location, using commonly known techniques, such as detecting saccade movement patterns, or in an alternate embodiment, simply waiting for a dwelling time. As illustrated in FIG. 5D, when the eyes of the user move from the location of the icon 505 to the new resting location, the electronic processor 135 controls the display projector 140 to display the information window 510 at the new resting location. The electronic processor 135 may further control the display projector 140 to display the information window 510 at substantially the same focal distance as the distance at which the eyes of the user are focused when looking at the new resting location.

In FIG. 5D, the new resting location is in the upper right corner of the field of vision 305 (as indicated by the eye symbol 330) and at a focal distance of infinity. To represent that the eyes of the user are focused at a distance that approximately corresponds to a focal distance of infinity, the mountain range 320 is shown in solid lines and the sign 315 is shown in dashed lines, similar to FIG. 4B. The information window 510 is displayed at the new resting location and at a focal distance of infinity because the eyes of the user moved to that location and focused at that distance after looking at the icon 505.

The embodiments described with respect to FIGS. 5A through 5C and FIGS. 5A, 5B, and 5D are two exemplary embodiments. In other embodiments, the eyes of the user are focused at a distance beyond the infinity threshold distance 415 (that is, focal distance of infinity) when the icon 505 is displayed. Thus, the icon 505 is displayed at a focal distance that is less than infinity such that the icon 505 is out of focus with respect to the eyes of the user. In still other embodiments, the eyes of the user are focused at a distance that is less than the infinity threshold distance 415 after looking at the icon 505. Thus, in some embodiments, the information window 510 may be displayed at a focal distance of less than infinity such that the focal distance corresponds to the distance at which the eyes of the user are focused after looking at the icon 505.

Figure 6:
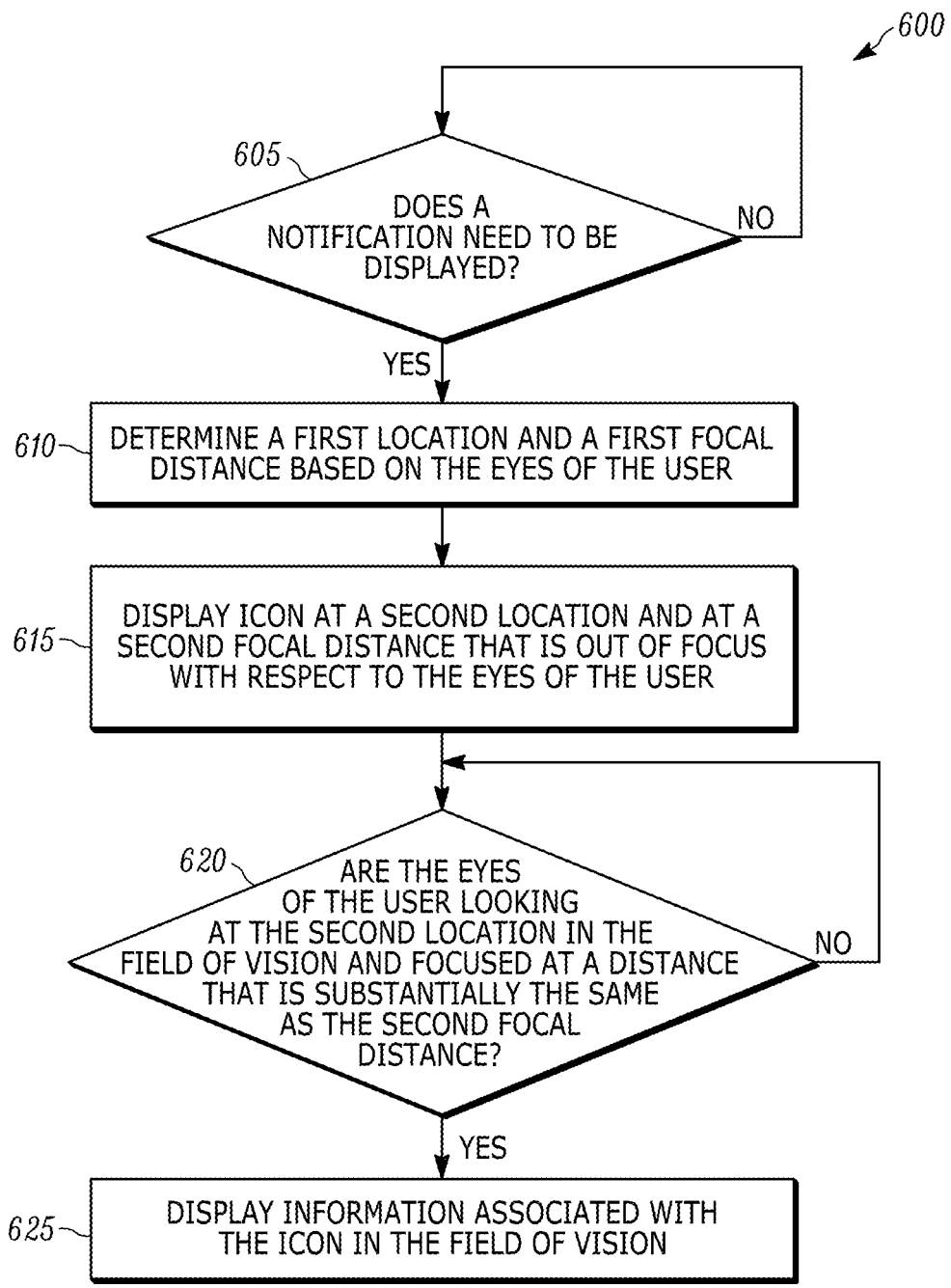
FIG. 6 illustrates a flowchart of a method of displaying icons and information on the head-mounted display in one exemplary embodiment.

FIG. 6 illustrates a flowchart of an exemplary method 600 that the electronic processor 135 may perform in one embodiment to display icons 505 on the head-mounted display 100. FIG. 6 corresponds to FIGS. 5A through 5C. At block 605, the electronic processor 135 determines if a notification needs to be displayed on the head-mounted display 100. When a notification does not need to be displayed, the method 600 remains at block 605. When a notification needs to be displayed to the user, at block 610, the electronic processor 135 receives data from the eye tracking assemblies 130. Using the data received from the eye tracking assemblies 130, the electronic processor 135 determines a first location in the field of vision 305 where the eyes are looking and a first distance at which the eyes are focused (that is, a first focal distance).

At block 615, the electronic processor 135 controls the display projector 140 to display the icon 505 at a second location in the field of vision 305 and at a second focal distance. The second location in the field of vision 305 is selected by the electronic processor 135 such that the icon 505 will minimally impede the vision of the user (that is, the icon 505 will be displayed at a second location where the eyes of the user are not currently looking). Additionally, the second focal distance is selected by the electronic processor 135 such that the icon 505 is out of focus with respect to the first focal distance (that is, the icon 505 is displayed at a focal distance that is out of focus with respect to the current distance at which the eyes of the user are focused). The electronic processor 135 may control the display projector 140 to display the icon 505 at a predetermined size based on the first focal distance or the second focal distance.

At block 620, the electronic processor 135 uses data received from the eye tracking assemblies 130 to determine whether the eyes of the user are looking at the second location in the field of vision 305 and are focused at a distance that is substantially the same as the second focal distance (that is, whether the eyes are looking at the icon 505). When the electronic processor 135 determines that the eyes of the user are not looking at the second location in the field of vision 305 or are not focused at a distance that is substantially the same as the second focal distance, the method 600 remains at block 620 and waits until the eyes move to the second location and change focus to the second focal distance.

At block 620, when the electronic processor 135 determines that the eyes of the user are looking at the second location in the field of vision 305 and are focused at a distance that is substantially the same as the second focal distance, the method proceeds to block 625. At block 625, the electronic processor 135 controls the display projector 140 to display information associated with the icon 505 in the field of vision 305. The information associated with the icon 505 may be displayed in an information window 510.

Furthermore, the information associated with the icon 505 may be displayed at the second focal distance, which corresponds to the focal distance at which the icon 505 was displayed. The information associated with the icon 505 may be displayed at a focal distance that corresponds to the current distance at which the eyes of the user are focused (that is, in focus with respect to the eyes of the user), as determined by the electronic processor 135 using data received from the eye tracking assemblies 130. In some embodiments, such a focal distance may be substantially the same as the second focal distance. The electronic processor 135 may control the display projector 140 to display the information associated with the icon 505 at a predetermined size based on the focal distance at which the information associated with the icon 505 is displayed.

Additionally, the information associated with the icon 505 may be displayed in approximately the second location (that is, approximately the same location where the icon 505 was displayed). In some embodiments, the information associated with the icon 505 may be displayed in a different location, such as the first location or a third location. The location where the information associated with the icon 505 is displayed may be configurable by the user. Additionally, the focal distance at which the information associated with the icon 505 is displayed may be configurable by the user. Further, the location where the icon 505 is displayed may be a predetermined minimum or greater distance from the first location in the field of vision 305 (that is, the icon 505 may be displayed a certain distance away from where the eyes of the user are determined to be looking).

Figure 7:
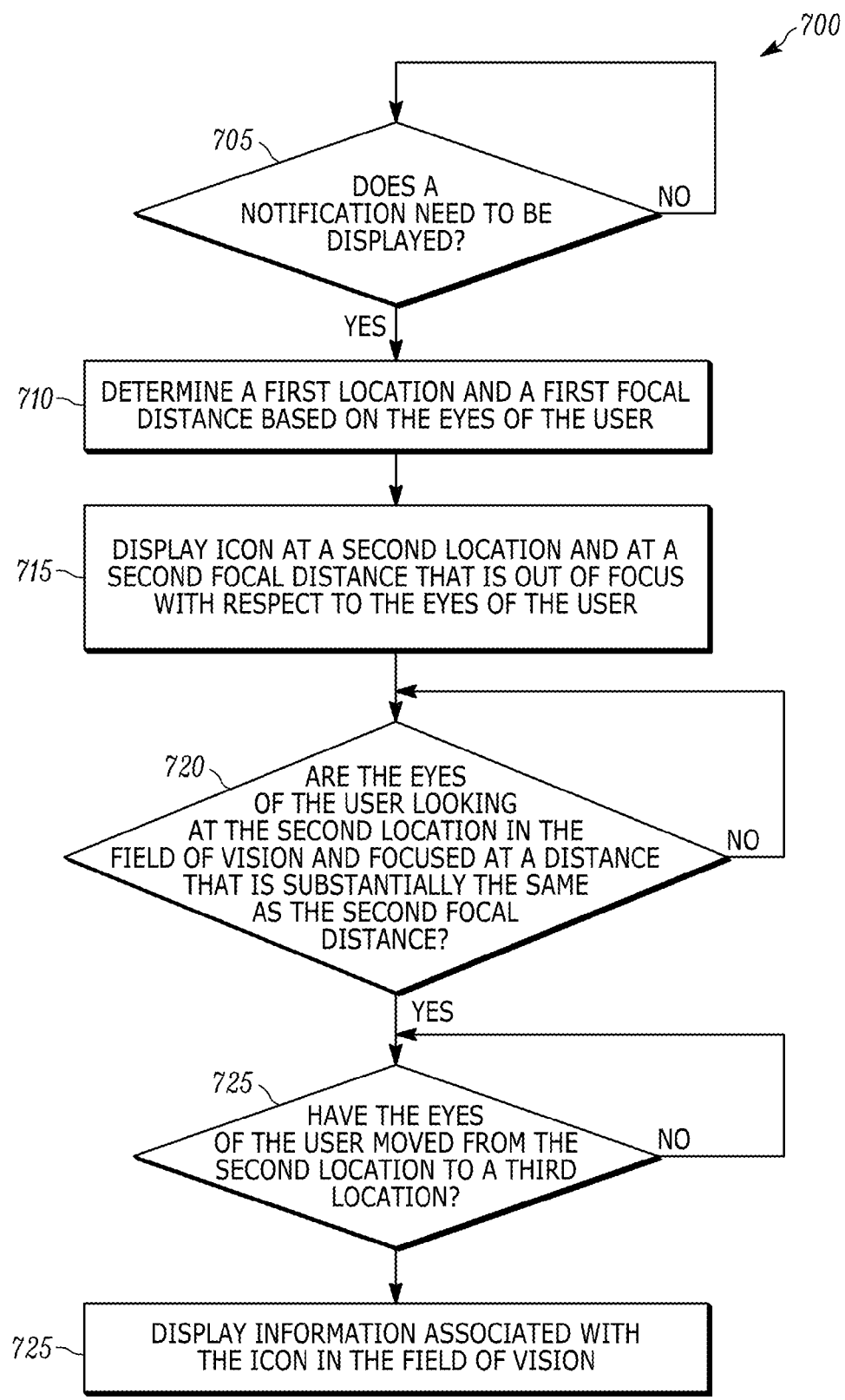
FIG. 7 illustrates a flowchart of a method of displaying icons and information on the head-mounted display in another exemplary embodiment.

FIG. 7 illustrates a flowchart of a method 700 that the electronic processor 135 may perform in another embodiment to display icons 505 on the head-mounted display 100. FIG. 7 corresponds to FIGS. 5A, 5B, and 5D. At block 705, the electronic processor 135 determines if a notification needs to be displayed to the user of the head-mounted display 100. When a notification does not need to be displayed to the user, the method 700 remains at block 705. When a notification needs to be displayed to the user, at block 710, the electronic processor 135 receives data from the eye tracking assemblies 130. Using the data received from the eye tracking assemblies 130, the electronic processor 135 determines a first location in the field of vision 305 where the eyes are looking and a first distance at which the eyes are focused (that is, a first focal distance).

At block 715, the electronic processor 135 controls the display projector 140 to display the icon 505 at a second location in the field of vision 305 and at a second focal distance. The second location in the field of vision 305 is selected by the electronic processor 135 such that the icon 505 will minimally impede the field of vision 305 of the user (that is, the icon 505 will be displayed at a second location where the eyes of the user are not currently looking). Additionally, the second focal distance is selected by the electronic processor 135 such that the icon 505 is out of focus with respect to the first focal distance (that is, the icon 505 is displayed at a focal distance that is out of focus with respect to the current distance at which the eyes of the user are focused). The electronic processor 135 may control the display projector 140 to display the icon 505 at a predetermined size based on the first focal distance or the second focal distance.

At block 720, the electronic processor 135 uses data received from the eye tracking assemblies 130 to determine whether the eyes of the user are looking at the second location in the field of vision 305 and are focused at a distance that is substantially the same as the second focal distance (that is, whether the eyes are looking at the icon 505). When the electronic processor 135 determines that the eyes of the user are not looking at the second location in the field of vision 305 or are not focused at a distance that is substantially the same as the second focal distance, the method 700 remains at block 720 and waits until the eyes move to the second location and change focus to the second focal distance.

At block 720, when the electronic processor 135 determines that the eyes of the user are looking at the second location in the field of vision 305 and are focused at a distance that is substantially the same as the second focal distance, the method 700 proceeds to block 725. At block 725, the electronic processor 135 uses data received from the eye tracking assemblies 130 to determine whether the eyes of the user have moved from the second location in the field of vision 305 to a third location in the field of vision 305. When the electronic processor 135 determines that the eyes of the user have not moved from the second location, the method 700 remains at block 725. When the electronic processor 135 determines that the eyes of the user have moved from the second location to the third location, at block 730, the electronic processor 135 controls the display projector 140 to display information associated with the icon 505 in the field of vision 305.

The information associated with the icon 505 may be displayed in an information window 510 at the third location in the field of vision 305 (that is, information associated with the icon 505 is displayed at the location where the eyes of the user are looking after viewing the icon 505). In some embodiments, the third location may be the same as the first location. Furthermore, the information associated with the icon 505 may be displayed at a third focal distance, which corresponds to the distance at which the eyes of the user are focused when looking at the third location. In some embodiments, the third focal distance may be substantially the same as the second focal distance or the first focal distance. The electronic processor 135 may control the display projector 140 to display the information associated with the icon 505 at a predetermined size based on the third focal distance.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A head-mounted display, comprising
a display projector;
a lens system;
an eye tracking assembly capable of tracking a direction of an eye; and
an electronic processor that controls the display projector, based on received data from the eye tracking assembly,
wherein the electronic processor determines, based on received data from the eye tracking assembly, at least one focal distance selected from the group consisting of a first focal distance, a second focal distance, and a third focal distance, and
wherein the electronic processor controls the display projector to display, on the lens system an icon associated with a notification at the second focal distance, the second focal distance being out of focus with respect to the first focal distance, and information associated with the notification in response to changes in focal distance determined by the electronic processor based on received data from the eye tracking assembly.

2. The head-mounted display of claim 1, wherein the information associated with the notification is displayed at the second focal distance when the electronic processor determines, based on received data from the eye tracking assembly, that the received data substantially corresponds to the second focal distance.

3. The head-mounted display of claim 1,
wherein the electronic processor determines, based on received data from the eye tracking assembly, that the received data substantially corresponds to the second focal distance,
wherein the information associated with the notification is displayed at the third focal distance when the electronic processor determines, based on later-received data from the eye tracking assembly, that the later-received data substantially corresponds to the third focal distance.

4. The head-mounted display of claim 1, wherein the third focal distance is substantially the same as the first focal distance.

5. The head-mounted display of claim 1, wherein the information associated with the icon includes at least one selected from the group consisting of a description of a situation, a code corresponding to a predetermined situation, and directions to a location.

6. A method of displaying information on a head-mounted display, the method comprising:
determining, with an eye tracking assembly and an electronic processor of the head-mounted display:
a first focal distance based on a first distance at which eyes are focused, and
a first location in a field of vision where the eyes are looking;
displaying, with a display projector and a lens system of the head-mounted display, an icon at a second location in the field of vision at a second focal distance, the second focal distance being out of focus with respect to the first focal distance;
determining, with the eye tracking assembly and the electronic processor of the head-mounted display, whether the eyes are looking at the second location in the field of vision and whether the eyes are focused at a second distance that is substantially the same as the second focal distance; and
displaying, with the display projector and the lens system of the head-mounted display, information associated with the icon in the field of vision at at least one focal distance selected from the group consisting of the second focal distance and a third focal distance,
wherein displaying, with the display projector and the lens system of the head-mounted display, information at the third focal distance includes determining, with the eye tracking assembly and the electronic processor of the head-mounted display, the third focal distance based on a third distance at which the eyes are focused after the eyes have viewed the second location in the field of vision.

7. The method of claim 6, wherein displaying, with the display projector and the lens system of the head-mounted display, the icon at the second location in the field of vision includes locating the second location in the field of vision at a predetermined minimum or greater distance from the first location in the field of vision.

8. The method of claim 6, wherein displaying, with the display projector and the lens system of the head-mounted display, information associated with the icon in the field of vision includes displaying information associated with the icon in the field of vision at the second location in the field of vision.

9. The method of claim 6, wherein displaying, with the display projector and the lens system of the head-mounted display, information associated with the icon in the field of vision includes:
  determining, with the eye tracking assembly and the electronic processor, a third location in the field of vision where the eyes are looking after the eyes have moved from the second location in the field of vision, and
  displaying, with the display projector and the lens system of the head-mounted display, information at the third location in the field of vision.

10. The method of claim 6, wherein displaying, with the display projector and the lens system of the head-mounted display, the icon at the second location in the field of vision includes displaying, with the display projector and the lens system of the head-mounted display, the icon at the second location at a predetermined size based on at least one selected from the group consisting of the first focal distance and the second focal distance.

11. The method of claim 6, wherein determining the third focal distance includes determining that the third focal distance is substantially the same as the first focal distance.

12. The method of claim 6, wherein displaying, with the display projector and the lens system of the head-mounted display, information associated with the icon in the field of vision includes displaying information that includes at least one selected from the group consisting of a description of a situation, a code corresponding to a predetermined situation, and directions to a location.

13. A head-mounted display, controlled at least in part by tracked eye movements of eyes of a user within a field of vision, the head-mounted display comprising:
  at least one display projector;
  a lens system;
  an eye tracking assembly capable of tracking a direction of an eye; and
  an electronic processor configured to
    obtain data from the eye tracking assembly,
    determine a first focal distance based on a first distance at which the eyes are focused,
    determine a first location in the field of vision where the eyes are looking,
    control the at least one display projector to display, on the lens system, an icon at a second location in the field of vision at a second focal distance, the second focal distance being out of focus with respect to the first focal distance,
    determine whether the eyes are looking at the second location in the field of vision and whether the eyes are focused at a second distance that is substantially the same as the second focal distance, and
    control the at least one display projector to display, on the lens system, at at least one focal distance selected from the group consisting of the second focal distance and a third focal distance, information associated with the icon in the field of vision,
    wherein the third focal distance is determined based on a third distance at which the eyes are focused after the eyes have moved from the second location in the field of vision.

14. The head-mounted display of claim 13, wherein the second location in the field of vision is located a predetermined minimum or greater distance from the first location in the field of vision.

15. The head-mounted display of claim 13, wherein the information associated with the icon is displayed at the second location in the field of vision.

16. The head-mounted display of claim 13, wherein the electronic processor is further configured to
  determine a third location in the field of vision where the eyes are looking after the eyes have moved from the second location in the field of vision, and
  control the at least one display projector to display, on the lens system, information associated with the icon at the third location in the field of vision.

17. The head-mounted display of claim 13, wherein the icon is displayed at a predetermined size based on at least one selected from the group consisting of the first focal distance and the second focal distance.

18. The head-mounted display of claim 13, wherein the third focal distance is substantially the same as the first focal distance.

19. The head-mounted display of claim 13, wherein the information associated with the icon includes at least one selected from the group consisting of a description of a situation, a code corresponding to a predetermined situation, and directions to a location.

20. The head-mounted display of claim 13, further comprising a transceiver that receives data from a mobile communication device;
  wherein the transceiver receives a notification from the mobile communication device, and
  wherein the electronic processor associates the notification with the icon.

* * * * *